Nov. 1, 1955 — J. R. BARR — 2,722,679
TRANSFORMER OVERLOAD INDICATOR
Filed May 25, 1953 — 2 Sheets-Sheet 1
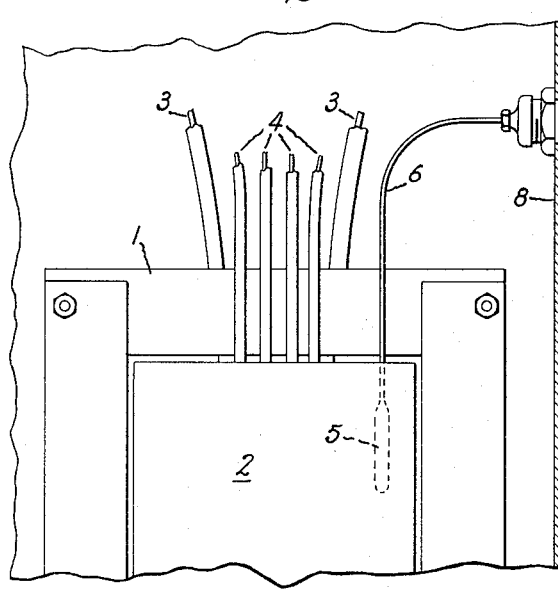
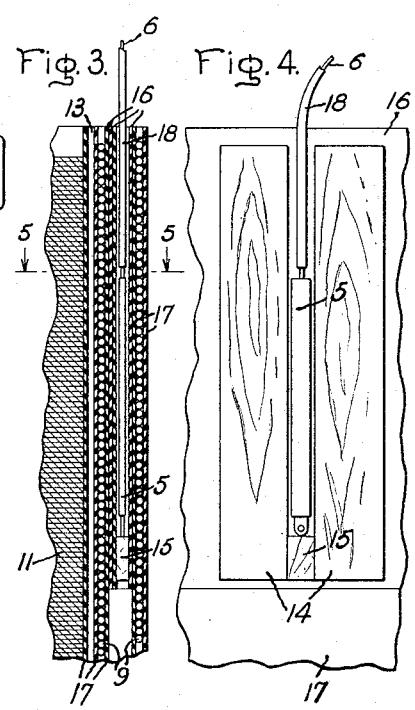
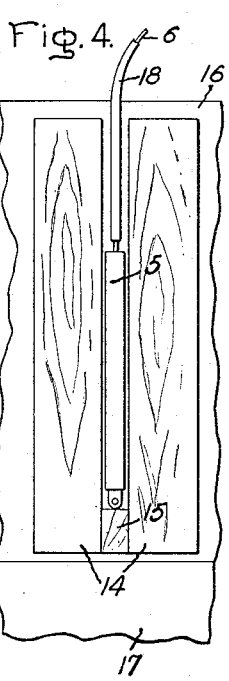
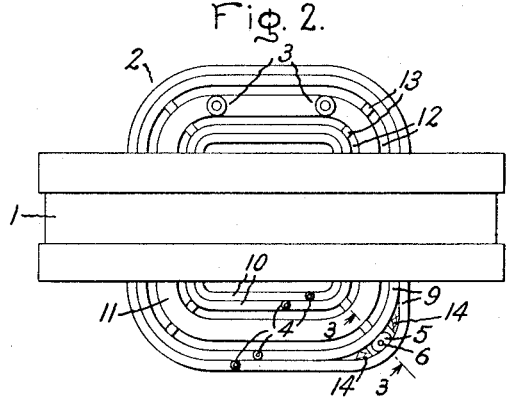
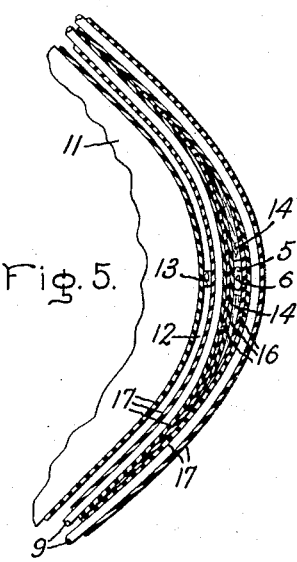
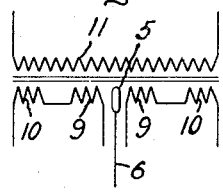
Inventor:
James R. Barr,
by Gilbert P. Tarleton
His Attorney.

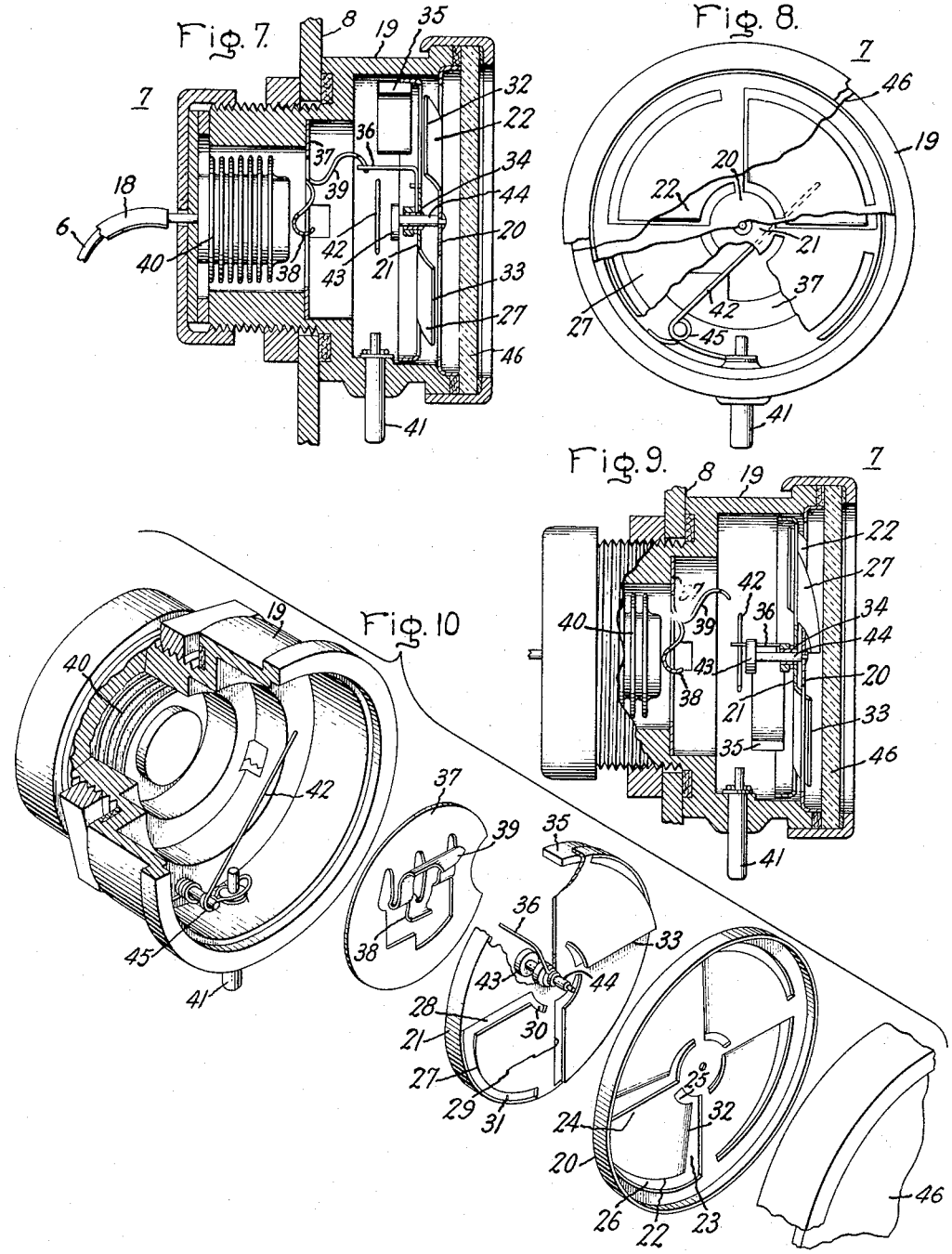

United States Patent Office 2,722,679
Patented Nov. 1, 1955

2,722,679

TRANSFORMER OVERLOAD INDICATOR

James R. Barr, Pittsfield, Mass., assignor to General Electric Company, a corporation of New York Application May 25, 1953, Serial No. 357,287

5 Claims. (Cl. 340—248)

This invention relates to an overload indicator, and more particularly to an overload indicator for a transformer.

Overload indicators for transformers usually comprise a thermal element positioned within the transformer tank thermally responsive to the temperature of the electrical windings of he transformer, and a visual indicator or signal mechanism mounted on the exterior of the transformer tank. When an overload occurs the thermally responsive element which is coupled to the visual indicator or signal mechanism causes the latter to indicate or signal an overload condition. The maximum temperature of the electrical windings of a transformer determines when an overload exists. However, different windings of the same transformer do not always have a uniform temperature. Accordingly, to get an accurate indication of overload conditions it is imperative that the thermally responsive element be correctly positioned within the electrical windings.

Known visual indicator or signal mechanisms mounted on the exterior of the transformer tank take a great variety of forms; however, most of them tend to be complicated and costly, not always giving a clearly visible indication of overload conditions and having complicated resetting mechanisms.

It is an object of this invention to provide a transformer overload indicator wherein the thermally responsive element of the overload indicator is so positioned within the electrical windings of the transformer that accurate indication of overload conditions is attained.

It is a further object of this invention to provide a low cost transformer overload indicator which is simple, easily resettable, and which gives a clearly visible signal of overload conditions.

In a transformer having electrical windings surrounding a magnetic core leg, said electrical windings comprising two innermost adjacent and substantially concentric layers of low voltage windings, and two outermost adjacent and substantially concentric layers of low voltage windings, with a high voltage winding positioned between said two innermost and outermost low voltage windings, each of said innermost layers being connected electrically in series with one of said outermost layers to provide two low voltage winding sections, my invention comprises an overload indicator in combination with said electrical windings wherein said overload indicator has a thermally responsive element, said thermally responsive element positioned between the two outermost low voltage layer windings, said element being responsive to overload conditions in either of said two low voltage winding sections.

My invention further comprises an overload indicator having two circular disks, said disks positioned one behind the other, the front disk being stationary and the rear disk being rotatable and axially movable, each of said disks having four approximately 90° sector-like blades thereon; each of said blades defined by an arc-like slot adjacent the center and circumference of the disk on which said blade is positioned, a radial slot extending from an end of said center adjacent arc-like slot to an end of said circumference adjacent arc-like slot and intersecting both of said arc-like slots, and the other ends of said arc-like slots connected by a radially extending rib-like portion of the disk on which said blade is positioned; the blades on said front disk offset rearwardly at an angle with respect to the longitudinal plane of the rib-like portions of said front disk, and the blades of said rear disk offset forwardly at an angle with respect to the longitudinal plane of the rib-like portions of said rear disk, said rear disk blades when said rear disk is rotated approximately 90° entering the radial slots of said front disk and passing in front of said front disk blades to cover substantially the entire front surface of said front disk.

My invention further comprises an overload indicator comprising a housing, two circular disks positioned in said housing, one of said disks positioned behind the other, the front disk being stationary and the rear disk being rotatable and axially movable, each of said disks having four approximately 90° sector-like integral blades thereon, each of said blades having a leading edge and two side edges defined by a radial slot intersecting the ends of two arc-like slots within the disk on which said blade is positioned, the front disk blades offset rearwardly towards the rear disk and the rear disk blades offset forwardly towards the front disk, said rear disk blades when said rear disk is rotated approximately 90° in one direction entering the radial slots of said front disk and passing in front of said front disk blades to cover substantially the entire front surface of said front disk, said rear disk rotated in said one direction by a counterweight positioned on said rear disk and a reset mechanism for uncovering the front surface of said front disk comprising a crank rotatable simultaneously with said rear disk, a plunger extending exteriorly of said housing into said housing, depression of said plunger actuating an intermediary member to engage and rotate said crank arm approximately 90° in a direction opposite to said one direction, and a releasable latch engageable with said crank to hold said rear disk in its reset position and to release said rear disk for rotation in said one direction by said counterweight.

The invention will be better understood by considering the following description taken in connection with the accompanying drawings and its scope will be pointed out in the appended claims.

In the drawings,

Figure 1 is a front view of a transformer apparatus embodying my invention;

Figure 2 is a top view of the transformer apparatus of Figure 1;

Figure 3 is a sectional view of a portion of the transformer apparatus embodying my invention, the section being taken along the line 3—3 of Figure 2;

Figure 4 is a front view of the bulb and bulb well used in my invention;

Figure 5 is a sectional view of a portion of the transformer apparatus embodying my invention, the section being taken along the line 5—5 of Figure 3;

Figure 6 is a diagrammatic illustration of how the thermally responsive element of my invention is thermally coupled to the two low voltage winding sections of a transformer;

Figure 7 is a sectional view of the signal mechanism of my invention, the mechanism parts being shown in their reset or non-overload condition;

Figure 8 is a front view of the mechanism of Figure 7, certain parts being broken away for purposes of clarity;

Figure 9 is a sectional view similar to that of Figure 7 except that the parts are shown in the positions they occupy upon indicating overload;

Figure 10 is an exploded view in perspective of the parts comprising my signal mechanism. Identical reference numerals throughout the various figures indicate like parts.

Referring now to the drawings, and most particularly to Figure 1, shown therein is a transformer apparatus 5 embodying my invention. The transformer comprises a magnetic core 1 and electrical windings 2 surrounding a central leg of the magnetic core 1. The electrical windings 2 have high voltage leads 3 and low voltage leads 4 extending therefrom. An overload indicator comprising a thermally responsive element or bulb 5 positioned within the electrical windings 2 is coupled or connected by a connector element or capillary tube 6 to an indicator or signal mechanism 7 mounted on the wall 8 of the transformer tank.

As seen clearly in Figure 2, the electrical windings 2 comprise two adjacent outermost substantially concentric low voltage electrical winding layers 9 and two adjacent innermost substantially concentric low voltage electrical winding layers 10. Between the innermost and outermost low voltage winding layers 10 and 9 are positioned high voltage electrical windings 11. The high voltage windings 11 are spaced from the innermost and outermost layers 10 and 9 by axial cooling ducts 12 and axial spacers 13.

One of the low voltage inner layers 10 is connected electrically in series with one of the low voltage outer layers 9, and the other of the inner and outer low voltage layers 10 and 9 are also connected in series. This gives two low voltage electrical winding sections. Since an overload condition may occur in either of these two low voltage winding sections the thermally responsive element or bulb 5 is positioned between the two electrical winding sections by being located between the two outermost layers 9. With such an arrangement the bulb 5 will respond to temperature changes in either of the two low voltage winding sections. This is diagrammatically illustrated in Figure 6.

This dual thermal response could also be obtained by positioning the bulb 5 between the two innermost layers 10. However, space limitations would make it difficult to maintain suitable spacing to insure electrical insulation between the capillary, electrical winding leads, and electrical windings. Accordingly, I prefer to place the bulb 5 between the outer layers 9 of the low voltage windings.

As seen in Figure 2, the electrical winding layers have a square-like configuration. The bulb 5 is positioned within one of the corners of said square-like configuration. Thus, the thermally responsive element 5 is positioned within the electrical windings free and clear of the electrical leads 3 and 4.

As seen in Figures 3 to 5, the pocket or well for the thermally responsive element or bulb 5 is formed by two parallel spaced wood or other insulating material thin wedge-shaped pieces 14 joined by a stop piece 15, all of said pieces being glued or otherwise suitably attached at front and back to one or more fiberboard or other insulating material layers 16. Since the bulb 5 and capillary tube 6 are constructed of metal and are connected to the indicating mechanism 7 mounted on the grounded transformer tank, this additional insulation is required beyond the normal insulating material layers 17 between the various electrical winding layers to ensure against electrical breakdown between the electrical winding coils and the metallic bulb 5 and capillary 6. Likewise, the capillary 6 is covered with an insulating material sleeve 18; however, this sleeve performs the additional function of preventing loss of heat from the vapors formed from the liquid within the bulb 5. It is to be noted that the insulation forming and surrounding the bulb well or pocket must be properly selected to provide against electrical breakdown but still not interfere with the ability of the bulb 5 to pick up heat to accurately respond to overload temperature conditions.

Referring now to Figures 7 to 10 for a detailed description of the construction and operation of my indicator or signal mechanism 7, in Figure 7 is shown a housing 19 having a glass window 46 mounted on the wall 8 of the transformer tank. In housing 19 are positioned two circular disks 20 and 21. Front disk 20 is stationary and rear disk 21 is mounted for rotary and axial movement on a shaft 44 connected to the center of front disk 20 and extending rearwardly therefrom.

Both disks 20 and 21 have blades or leaves and radial slots formed thereon adapted for interleaving or screw-like engagement. Thus, particularly noting Figure 10, front disk 20 has four approximately 90° sector-like blades or leaves 22 formed integrally thereon. Each of the blades 22 are defined by a radially extending slot 23, a radially extending rib-like portion 24, an arc-like slot 25 adjacent the center of the disk 20, and an arc-like slot 26 adjacent the circumference of the disk 20. The radially extending slot 23 intersects an end of the arc-like slots 25 and 26, and the rib-like portion 24 intersects the opposite ends of the arc-like slots 25 and 26. The blades 22 are offset at a slight angle rearwardly from the longitudinal plane of the disk 20, said plane containing the rib-like portions 24 and the central hub portion of said disk 20.

Disk 21 is constructed similarly to disk 20, and has four approximately 90° sector-like blades 27 formed integrally thereon, each of said blades being defined by a radially extending slot 28, a radially extending rib-like portion 29, and inner and outer arc-like slots 30 and 31, said arc-like slots 30 and 31 being intersected at their opposite ends by radial slot 28 and rib or web-like portion 29. Said rear disk blades or leaves 27 are offset forwardly at a slight angle with respect to the longitudinal plane of the disk 21 towards the front disk 20. Viewing Figure 10, the leading edges 32 of the front disk blades 22 face in the counterclockwise direction, and the leading edges 33 of the rear disk blades 27 face in the clockwise direction. That is, the front and rear disk blades are oppositely disposed with respect to each other so that when the rear disk or plate 21 is rotated clockwise approximately 90° and moved axially forward, the rear disk blades 27 will enter the radial slots 23 of the front disk 20, pass in front of the front disk blades 22, and cover substantially the entire front surface of the disk or plate 20. As will appear later, the rear and front disk blades become interleaved when an overload occurs in the transformer apparatus. The front surface of the front disk 20 can be given a color similar to the conventional dull gray color given transformer tanks. The front surface of the rear disk 21 can be given a bright color as red or yellow. When an overload condition occurs and the rear and front disk blades become engaged in screw-like fashion, the front surface of the front disk 20 will change to a clearly visible color to signal overload conditions. The blade construction of the disks makes it possible to change the color of substantially the entire front surface of the front disk 20 with only about a 90° rotation of the rear disk. Also, interleaving blades make it possible to dispense with the necessity of a stop for the rear rotatable disk 21 when said rear disk 21 is rotating in a clockwise direction. It should be noted that the rear disk 21 need not necessarily rotate clockwise during overload conditions. This direction can obviously be reversed by reversing the directions in which the leading edges 32 and 33 face.

Mounted at the center of front disk 20 and extending axially rearwardly therefrom is a shaft 44. Rear disk 21 is positioned on shaft 44 for rotary and axial movement with respect to stationary disk 20. Rotary disk 21 is mounted on shaft 44 by a sleeve member 34 so that the disk 21 can move on the shaft 44 smoothly with no binding or chattering. Rotary clockwise movement is imparted to the rear disk 21 by a counterweight 35. Obviously a spring can be used to rotate the rear disk 21 clockwise; however, I prefer a counterweight because of its simplicity. Since only about a 90° rotation of the rear disk is required, the use of a counterweight is made practical.

Connected to the sleeve 34 is a crank 36 which rotates simultaneously with the rear disk 21. In the reset or non-overload indicating position of the signal mechanism the rearwardly extending handle of the crank 36 will be engaged by a releasable latch mechanism, as is clearly shown in Figure 7. The latch mechanism comprises a disk 37 having two oppositely disposed spring fingers 38 and 39 punched thereon. On overload a bellows actuator 40 connected to bulb 5 by capillary 6 will expand and engage finger 38 causing finger 39 to move upwardly out of the path of rotation of the crank handle, thereby releasing disk 21 for rotary signal movement by the counterweight 35 as is clearly shown in Figure 9.

The resetting mechanism for the indicator comprises a plunger 41 extending into the housing 19 and engageable with a spring element 45 having an upstanding end or lever 42. When the plunger is depressed it will tension the spring element 45, causing its upstanding end 42 to move transversely or counterclockwise across the path of rotation of the handle of crank 36. During this transverse movement the upstanding spring end or lever 42 will engage the handle of crank 36 and cause the crank 36 and rear disk 21 to simultaneously rotate approximately 90° counterclockwise whereupon the handle of crank 36 will catch upon the latch finger 39 to hold the signal mechanism in a reset or non-overload indicating position. A stop or knob 43 is formed on the rearmost end of shaft 44 to keep the rotatable and axially movable disk 21 from coming off the shaft 44.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. In a transformer having a magnetic core leg surrounded by high and low voltage electrical windings, said low voltage windings having two electrical winding sections, each of said sections comprising at least one cylindrical-like layer of electrical windings, said one layer of said sections positioned concentrically adjacent to each other, an overload indicator in combination with said low voltage windings responsive to an overload in either of said low voltage winding sections, said overload indicator comprising a thermally responsive element, said element positioned between said layers.

2. In a transformer having low voltage electrical windings, said windings comprising four substantially concentric electrical winding layers, one of the two innermost layers connected electrically in series with one of the two outermost layers and the other of said two innermost layers connected electrically in series to the other of said two outermost layers to provide two low voltage electrical winding sections, an overload indicator in combination with said low voltage electrical windings responsive to an overload in either of said sections, said indicator comprising a thermally responsive element, said element positioned between said two outermost layers.

3. In a transformer having a magnetic core leg surrounded by electrical windings, said electrical windings comprising high and low voltage electrical windings, said low voltage windings comprising two adjacent innermost substantially concentric low voltage winding layers and two adjacent outermost substantially concentric low voltage winding layers, said high voltage windings positioned between said innermost and outermost layers, one of said innermost layers connected electrically in series with one of said outermost layers and the other of said innermost layers connected electrically in series to the other of said outermost layers to provide two low voltage electrical winding sections, an overload indicator in combination with said low voltage windings responsive to an overload in either of said low voltage winding sections, said overload indicator comprising a thermally responsive element, said element positioned between said two adjacent outermost low voltage winding layers.

4. In a transformer as in claim 3, wherein each of said innermost and outermost layers and said high voltage windings surround said magnetic core leg along substantially the entire length thereof, said innermost and outermost layers and said high voltage windings presenting a square-like configuration when viewed from adjacent one end of said magnetic core leg, and terminal leads extending from said high voltage windings and each of said innermost and outermost layers, said high voltage winding leads extending from said high voltage windings adjacent said one end from one side of said square-like configuration, said innermost and outermost layer leads extending from said innermost and outermost layers adjacent said one end from the side of said square-like configuration opposite to said one side, said thermally responsive element positioned within a corner of said square-like configuration, and a connector element attached to said thermally responsive element and extending from between said two adjacent outermost layers at said corner adjacent said one end.

5. In a transformer having a magnetic core leg surrounded by electrical windings, said leg and said electrical windings housed within an electrically grounded transformer tank, said electrical windings comprising high and low voltage electrical windings, said low voltage windings comprising two adjacent innermost substantially concentric low voltage winding layers and two adjacent outermost substantially concentric low voltage winding layers, said high voltage windings positioned between said innermost and outermost layers, one of said innermost layers connected electrically in series with one of said outermost layers and the other of said innermost layers connected electrically in series to the other of said outermost layers to provide two low voltage electrical winding sections, an overload indicator in combination with said low voltage windings responsive to an overload in either of said low voltage winding sections, said overload indicator comprising a metal bulb element having a thermally responsive fluid therein, a metal housed visual indicator mechanism having a bellows actuator, and a metal capillary tube connecting said bulb element and said bellows actuator, said metal bulb element positioned between said two adjacent outermost low voltage winding layers, and said metal housed visual indicator mechanism mounted on a side of said electrically grounded transformer tank, and means for preventing grounding of said innermost and outermost layers and said high voltage windings through said metal bulb element, capillary, metal housed visual indicator mechanism, and electrically grounded transformer tank, comprising an electrical insulating material surrounding said metal bulb and said metal capillary.

References Cited in the file of this patent

UNITED STATES PATENTS

| | | |
|---|---|---|
| 1,668,388 | Treanor | May 1, 1928 |
| 2,351,983 | Leonard | June 20, 1944 |
| 2,457,069 | Rauh | Dec. 21, 1948 |
| 2,652,020 | Hart | Sept. 15, 1953 |